United States Patent
Ikoma

(10) Patent No.: US 10,170,787 B2
(45) Date of Patent: Jan. 1, 2019

(54) SEPARATOR

(71) Applicant: BROTHER KOGYO KABUSHIKI KAISHA, Nagoya-shi, Aichi (JP)

(72) Inventor: Atsuki Ikoma, Okazaki (JP)

(73) Assignee: BROTHER KOGYO KABUSHIKI KAISHA, Nagoya-shi, Aichi (JP)

( * ) Notice: Subject to any disclaimer, the term of this patent is extended or adjusted under 35 U.S.C. 154(b) by 0 days.

(21) Appl. No.: 15/257,242

(22) Filed: Sep. 6, 2016

(65) Prior Publication Data

US 2016/0380276 A1 Dec. 29, 2016

Related U.S. Application Data

(63) Continuation of application No. PCT/JP2015/056313, filed on Mar. 4, 2015.

(30) Foreign Application Priority Data

Mar. 5, 2014 (JP) ................. 2014-042652

(51) Int. Cl.
*H01M 8/0258* (2016.01)
*H01M 8/0267* (2016.01)
(Continued)

(52) U.S. Cl.
CPC ....... *H01M 8/2483* (2016.02); *H01M 8/0258* (2013.01); *H01M 8/0267* (2013.01); *H01M 8/241* (2013.01); *H01M 2008/1095* (2013.01)

(58) Field of Classification Search
CPC combination set(s) only.
See application file for complete search history.

(56) References Cited

U.S. PATENT DOCUMENTS

2002/0031698 A1* 3/2002 Inoue ................. H01M 8/0271
429/481
2002/0155333 A1* 10/2002 Fitts ......................... C25B 9/04
429/439
(Continued)

FOREIGN PATENT DOCUMENTS

JP   2003-187853 A   7/2003
JP   2005-317311 A   11/2005
(Continued)

OTHER PUBLICATIONS

Office Action issued in the corresponding Japanese patent application No. 2014-042652 dated Sep. 13, 2016.
(Continued)

*Primary Examiner* — Kaity V Chandler
(74) *Attorney, Agent, or Firm* — K&L Gates LLP

(57) ABSTRACT

An example separator includes: a flat plate-shaped first plate member; a flat plate-shaped second plate member joined with the first plate member; an oxidation gas flow channel wall, which forms a flow channel of oxidation gas; a fuel gas flow channel wall, which forms a flow channel of fuel gas; a cooling medium flow channel wall, which forms a flow channel of a cooling medium; a first through hole, which penetrates the first plate member and the second plate member; a second through hole, which penetrates the first plate member and the second plate member; a first cooling medium passage part; a second cooling medium passage part; one projection, which is formed on at least one of the first cooling medium passage part and the second cooling medium passage part; and another projection, which is formed at a position corresponding to the one projection.

10 Claims, 7 Drawing Sheets

(51) Int. Cl.
*H01M 8/2483* (2016.01)
*H01M 8/241* (2016.01)
*H01M 8/1018* (2016.01)

(56) References Cited

U.S. PATENT DOCUMENTS

| | | | |
|---|---|---|---|
| 2003/0082429 A1* | 5/2003 | Nishimura | H01M 4/8605 429/414 |
| 2003/0203260 A1* | 10/2003 | Lee | H01M 8/04029 429/434 |
| 2004/0110056 A1* | 6/2004 | Hatoh | H01M 8/026 429/431 |
| 2004/0115512 A1* | 6/2004 | Fujii | H01M 8/241 429/434 |
| 2004/0180248 A1* | 9/2004 | Matsubayashi | H01M 8/0267 429/413 |
| 2004/0229100 A1* | 11/2004 | Komura | H01M 8/0247 429/457 |
| 2005/0112422 A1* | 5/2005 | Yoshimoto | H01M 8/0247 429/434 |
| 2005/0208361 A1* | 9/2005 | Enjoji | H01M 8/2457 429/483 |
| 2005/0221146 A1* | 10/2005 | Horiguchi | H01M 8/0254 429/456 |
| 2005/0255367 A1* | 11/2005 | Takahashi | H01M 8/0265 429/434 |
| 2005/0258974 A1* | 11/2005 | Mahowald | H02J 4/00 340/632 |
| 2005/0277013 A1* | 12/2005 | Yamaga | H01M 8/0258 429/457 |
| 2007/0020504 A1* | 1/2007 | Sugita | H01M 8/0247 429/457 |
| 2007/0184327 A1* | 8/2007 | Ishioka | H01M 8/0273 429/457 |
| 2008/0050631 A1* | 2/2008 | Ito | B60L 11/1883 429/483 |
| 2009/0004547 A1* | 1/2009 | Vitella | H01M 8/0247 429/457 |
| 2010/0092811 A1* | 4/2010 | Badrinarayanan | H01M 8/0234 429/437 |
| 2010/0119905 A1* | 5/2010 | Kikuchi | H01M 8/0273 429/514 |
| 2010/0330461 A1* | 12/2010 | Watanabe | H01M 8/0247 429/514 |
| 2011/0281191 A1* | 11/2011 | Okanishi | H01M 8/026 429/444 |
| 2011/0305969 A1* | 12/2011 | Song | H01M 8/0204 429/467 |
| 2012/0295177 A1* | 11/2012 | Ishida | H01M 8/0267 429/434 |
| 2013/0209909 A1* | 8/2013 | Sugiura | H01M 8/0278 429/434 |
| 2013/0230785 A1* | 9/2013 | Terada | H01M 8/04007 429/434 |
| 2014/0248549 A1 | 9/2014 | Ushio et al. | |
| 2015/0093670 A1* | 4/2015 | Kobayashi | H01M 8/04067 429/434 |
| 2015/0200414 A1* | 7/2015 | Nagumo | H01M 8/0254 429/455 |
| 2015/0236358 A1* | 8/2015 | Hirata | H01M 8/0258 429/529 |
| 2016/0351921 A1* | 12/2016 | Kunz | H01M 8/021 |

FOREIGN PATENT DOCUMENTS

| | | |
|---|---|---|
| JP | 2008-277185 A | 11/2008 |
| JP | 2013-179087 A | 9/2013 |
| JP | 2014-170670 A | 9/2014 |

OTHER PUBLICATIONS

English translation of International Search Report of PCT/JP2015/056313 dated Apr. 7, 2015.
English translation of International Preliminary Report on Patentability dated Sep. 6, 2016 issued in the corresponding international patent application No. PCT/JP2015/056313.

* cited by examiner

SEPARATOR

CROSS-REFERENCE TO RELATED APPLICATIONS

This application is a Continuation application of PCT International Application No. PCT/JP2015/056313 which has an International filing date of Mar. 4, 2015 and designated the United States of America, and claiming priority on Patent Application No. 2014-042652 filed in Japan on Mar. 5, 2014. The contents of these applications are incorporated herein by reference in their entirety.

FIELD

The present disclosure relates to a separator wherein a surface on the anode side and a surface on the cathode side are constructed by joining two plate members.

BACKGROUND AND SUMMARY

A fuel battery is provided with a stack composed of laminated unit battery cells, each of which is obtained by sandwiching a membrane electrode assembly (MEA) with a pair of separators. An MEA has, for example, a cathode electrode and an anode electrode on both sides of a solid polymer electrolyte film. A fuel battery is, for example, a solid polymer fuel battery provided with a solid polymer electrolyte film. In a solid polymer fuel battery, fuel gas (e.g., hydrogen) supplied to an anode electrode in each unit battery cell of the stack reacts with oxidation gas (e.g., air) supplied to a cathode electrode, so that electric power and water are generated.

Among components of a solid polymer fuel battery, a separator is constituted of a plate member, which is electrically conductive. A flow channel of fuel gas is formed on one outer surface of the separator. A flow channel of oxidation gas is formed on the other outer surface of the separator. Some separators are obtained by constructing one separator from one plate member, while the others are obtained by constructing one separator from two joined plate members. Regarding a separator obtained by two joined plate members, a flow channel of fuel gas is formed on the outer surface of one plate member, and a flow channel of oxidation gas is formed on the outer surface of the other plate member. A flow channel of a cooling medium is formed on the inner surface which lies on the inner side of the two joined plate members.

One of conventional separators obtained by joining two plate members, for example, a separator, which has a structure that two separator plates obtained by processing conductive carbon sheets by cutting work are joined with each other, is disclosed. The two separator plates are respectively provided with a manifold hole, which functions as an inlet of cooling water, and another manifold hole, which functions as an outlet of cooling water. A flow channel of cooling water is formed on the inner surface of the two separator plates. On at least one of the two separator plates, a groove to be filled with sealant is provided at a position surrounding a manifold hole of each of an inlet and an outlet. As the groove is filled with sealant, leakage of cooling water is prevented.

A stack of a solid polymer fuel battery is constructed by laminating a plurality of unit battery cells. The plurality of unit battery cells are tightened in the lamination direction with a plurality of bolts. A conventional separator is composed of two separator plates obtained by processing conductive carbon sheets by cutting work. A conventional separator thus has high rigidity and therefore is unlikely to be deformed by pressure in the lamination direction. Accordingly, a flow channel of cooling water would not be closed by deformation of the separator plates.

However, in a case where a separator is composed of two thin metal plates, it is impossible to obtain high rigidity like a conventional separator. Possible separators composed of two thin metal plates include, for example, a separator which has a convex/concave shape formed by press work, cutting work or the like. The convex/concave shape forms a flow channel of fuel gas or oxidation gas on the outer surface of a thin metal plate, and forms a flow channel of cooling water on the inner surface of a thin metal plate. A separator having such a structure may possibly be deformed by pressure in the lamination direction when a stack is constructed. As the separator is deformed, the distribution channel of cooling water may possibly be closed.

In consideration of the above-described circumstances, it is an object to provide a separator, which can be constructed with two thin metal films and has a distribution channel of a cooling medium that can be maintained if being subject to pressure in the lamination direction.

According to one aspect of the example embodiment, the separator includes: a flat plate-shaped first plate member; a flat plate-shaped second plate member joined with the first plate member; an oxidation gas flow channel wall, which is provided on a first surface of the first plate member and forms a flow channel of oxidation gas; a fuel gas flow channel wall, which is provided on a second surface of the second plate member and forms a flow channel of fuel gas; a cooling medium flow channel wall, which is provided on at least one of a second surface that is a surface on a side opposite to the first surface of the first plate member and faces the second plate member, and a first surface that is a surface on a side opposite to the second surface of the second plate member and faces the first plate member, corresponds to at least one of the oxidation gas flow channel wall and the fuel gas flow channel wall, and forms a flow channel of a cooling medium; a first through hole, which is formed at a position different from the cooling medium flow channel wall and penetrates the first plate member and the second plate member; a second through hole, which is formed at a position different from the cooling medium flow channel wall and from the first through hole and penetrates the first plate member and the second plate member; a first cooling medium passage part, which is formed by separating a part of the second surface of the first plate member and a part of the first surface of the second plate member from each other and establishes communication between the first through hole and one end of the cooling medium flow channel wall; a second cooling medium passage part, which is formed by separating a part of the second surface of the first plate member and a part of the first surface of the second plate member from each other and establishes communication between the second through hole and the other end of the cooling medium flow channel wall; one projection, which is formed on at least one of the first cooling medium passage part and the second cooling medium passage part, is projected from the second surface of the first plate member toward the first surface of the second plate member, and is separated from the cooling medium flow channel wall; and another projection, which is formed at a position corresponding to the one projection on at least one of the first cooling medium passage part and the second cooling medium passage part, is projected from the first surface of the second plate member to the second surface of the first plate member, is separated from the cooling medium flow channel wall, and comes into contact with the one projection in a state where the first plate member and the second plate member are joined with each other.

According to one aspect of the example embodiment, the separator includes: a flat plate-shaped first plate member, which is made of metal; a flat plate-shaped second plate member, which is made of metal and is joined with the first plate member; an oxidation gas flow channel wall, which is provided on a first surface of the first plate member, is projected from the first surface, and forms a flow channel of oxidation gas; a fuel gas flow channel wall, which is provided on a second surface of the second plate member, is projected from the second surface, and forms a flow channel of fuel gas; a cooling medium flow channel wall, which is provided on a second surface that is a surface on a side opposite to the first surface of the first plate member and faces the second plate member as a groove corresponding to the oxidation gas flow channel wall, is provided on a first surface that is a surface on a side opposite to the second surface of the second plate member and faces the first plate member as a groove corresponding to the fuel gas flow channel wall, and forms a flow channel of a cooling medium; a first through hole, which is formed at a position different from the cooling medium flow channel wall and penetrates the first plate member and the second plate member; a second through hole, which is formed at a position different from the cooling medium flow channel wall and from the first through hole and penetrates the first plate member and the second plate member; a first cooling medium passage part, which is formed by separating a part of the second surface of the first plate member and a part of the first surface of the second plate member from each other and establishes communication between the first through hole and one end of the cooling medium flow channel wall; a second cooling medium passage part, which is formed by separating a part of the second surface of the first plate member and a part of the first surface of the second plate member from each other and establishes communication between the second through hole and the other end of the cooling medium flow channel wall; at least one first gasket line, which is a protrusion formed at a position of the first plate member corresponding to at least one of the first cooling medium passage part and the second cooling medium passage part and projected from the first surface of the first plate member; at least one second gasket line, which is a protrusion formed at a position of the second plate member corresponding to at least one of the first cooling medium passage part and the second cooling medium passage part and projected from the second surface of the second plate member; at least one first groove corresponding to the first gasket line formed on the second surface of the first plate member; at least one second groove corresponding to the second gasket line formed on the first surface of the second plate member; and a projection, which is formed on at least one of the first cooling medium passage part and the second cooling medium passage part, is projected from one toward the other of the second surface of the first plate member and the first surface of the second plate member, is extended in a direction crossing at least one of the first groove and the second grove, is formed to be divided into a plurality of parts with at least one of the first groove and the second groove being sandwiched therebetween, and is separated from the cooling medium flow channel wall.

According to one aspect of the example embodiment, the separator includes: a flat plate-shaped first plate member; a flat plate-shaped second plate member joined with the first plate member; an oxidation gas flow channel wall, which is provided on a first surface of the first plate member and forms a flow channel of oxidation gas; a fuel gas flow channel wall, which is provided on a second surface of the second plate member and forms a flow channel of fuel gas; a cooling medium flow channel wall, which is provided on at least one of a second surface that is a surface on a side opposite to the first surface of the first plate member and faces the second plate member and a first surface that is a surface on a side opposite to the second surface of the second plate member and faces the first plate member, corresponds to at least one of the oxidation gas flow channel wall and the fuel gas flow channel wall, and forms a flow channel of a cooling medium; a first through hole, which is formed at a position different from the cooling medium flow channel wall and penetrates the first plate member and the second plate member; a second through hole, which is formed as a position different from the cooling medium flow channel wall and from the first through hole and penetrates the first plate member and the second plate member; a first cooling medium passage part, which is formed by separating a part of the second surface of the first plate member and a part of the first surface of the second plate member from each other and establishes communication between the first through hole and one end of the cooling medium flow channel wall; a second cooling medium passage part, which is formed by separating a part of the second surface of the first plate member and a part of the first surface of the second plate member from each other and establishes communication between the second through hole and the other end of the cooling medium flow channel wall; and a plurality of projections, which are formed side by side in a cross direction to a passage direction of the cooling medium in at least one of the first cooling medium passage part and the second cooling medium passage part, is projected from one toward the other of the second surface of the first plate member and the first surface of the second plate member, and is separated from the cooling medium flow channel wall, wherein an interval between two projections including a center of a width in the cross direction of at least one of the first cooling medium passage part and the second cooling medium passage part is larger than an interval between an end part in the cross direction of at least one of the first cooling medium passage part and the second cooling medium passage part, and a projection adjacent to the end part.

With a separator of the present disclosure, it becomes possible to construct a separator with two thin metal plates and to maintain a distribution channel of a cooling medium if the separator is subject to pressure in the lamination direction.

The above and further objects and features will more fully be apparent from the following detailed description with accompanying drawings.

DETAILED DESCRIPTION OF NON-LIMITING EXAMPLE EMBODIMENTS

The following description will explain a separator according to one embodiment of the present disclosure and a fuel battery provided with the separator with reference to FIGS. 1A to 7. It is to be noted that the front-back, up-down and right-left directions in these figures are represented by orthogonal arrows in the respective figures.

<Entire Structure of Fuel Battery>

Figure 1A:
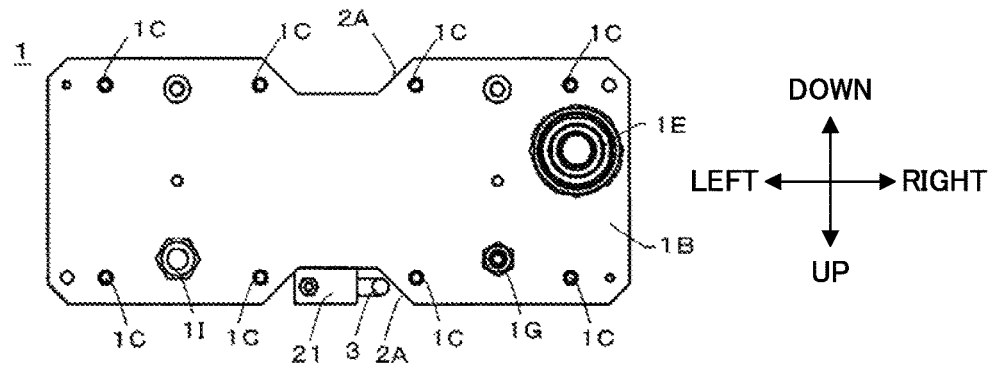
FIG. 1A is a back view illustrating a fuel battery provided with an example of non-limiting separator according to an embodiment.
Figure 1B:
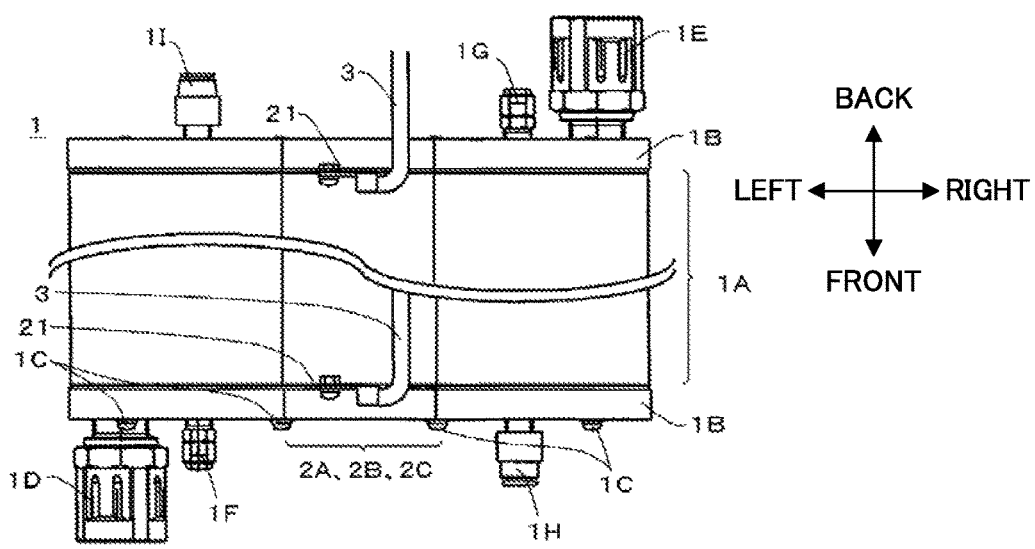
FIG. 1B is a plan view illustrating a fuel battery.
Figure 1C:
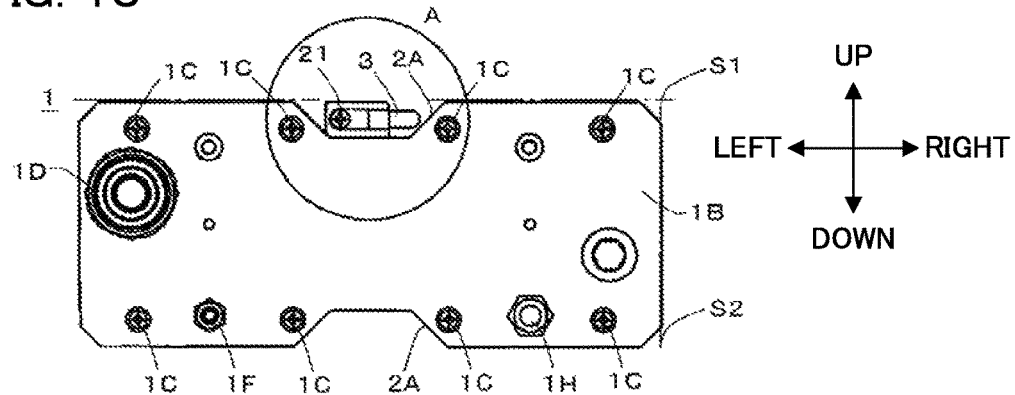
FIG. 1C is a front view illustrating a fuel battery.

In FIGS. 1A to 1C, a fuel battery 1 is provided with a stack 1A, two end plates 1B, a collector plate 20 (see FIG. 7) and eight bolts 1C. The stack 1A is composed of a plurality of laminated unit battery cells 100 (see FIG. 4). The two end plates 1B are provided on both ends of the stack 1A. The eight bolts 1C penetrate the stack 1A and the two end plates 1B in the lamination direction of the plurality of unit battery cells 100 and sandwich the stack 1A and the two end plates 1B. As illustrated in FIG. 1C, four of the eight bolts 1C and the other four are arranged at equal intervals along the respective first sides S1, which are a pair of long sides that are opposed to each other of each end plate 1B. It is to be noted that the longer direction of the two end plates 1B illustrated in FIGS. 1A to 1C is referred herein to as a right-left direction, and the short direction of the two end plates 1B is referred herein to as an up-down direction. In addition, the lamination direction of the plurality of unit battery cells 100 in the stack 1A illustrated in FIG. 1B is referred herein to as a front-back direction.

Figure 4:
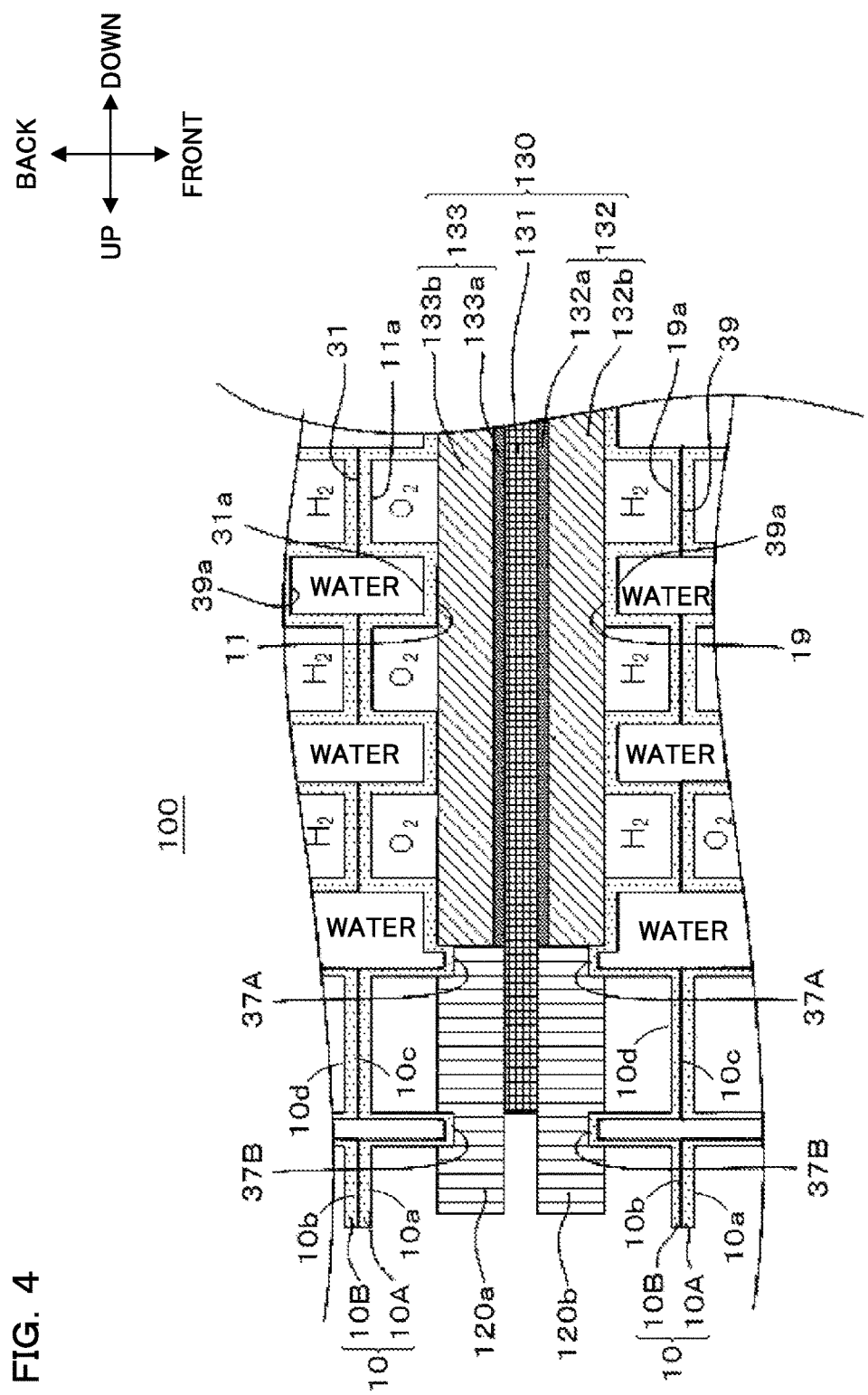
FIG. 4 is a schematic right side local longitudinal sectional view of one unit battery cell among a plurality of unit battery cells which constitute a fuel battery provided with a separator according to an embodiment.
Figure 7:
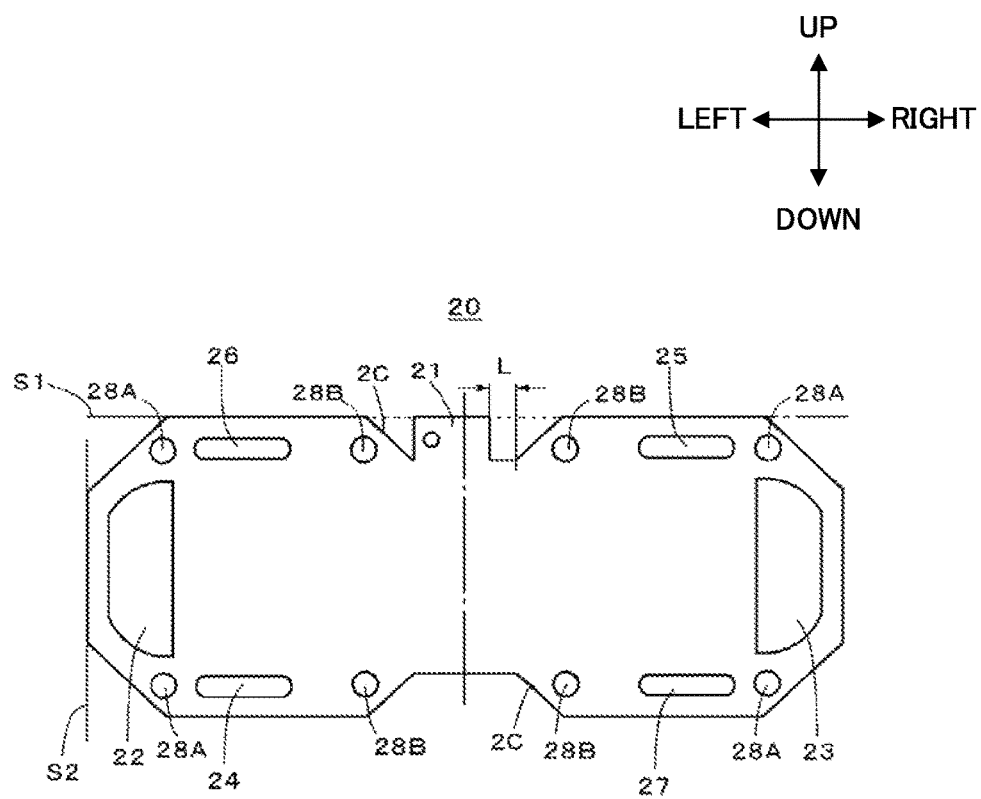
FIG. 7 is a schematic view illustrating a collector plate, which constitutes a fuel battery.

As illustrated in FIG. 4, each unit battery cell 100 which constitutes the stack 1A has a membrane electrode assembly 130, two gaskets 120a and 120b, and two separators 10. One gasket 120a contacts with one surface of the membrane electrode assembly 130, and the other gasket 120b contacts with the other surface of the membrane electrode assembly 130. One of the two separators 10 contacts with one surface of the membrane electrode assembly 130 via the gasket 120a. The other of the two separators 10 contacts with the other surface of the membrane electrode assembly 130 via the gasket 120b. The collector plate 20 illustrated in FIG. 7 is laminated adjacent to each of separators 10 positioned at both ends of the laminate of the unit battery cells 100.

As illustrated in FIGS. 1A and 1C, trapezoidal notches 2A are provided at the middle in the right-left direction of each end plate 1B, which constitutes the stack 1A, that is, at the middle of a pair of long sides opposed to each other. Corresponding to the notches 2A, trapezoidal notches 2B and 2C are respectively provided at the separators 10 illustrated in FIGS. 2A and 2B and at the collector plates 20 illustrated in FIG. 7. When a fuel battery 1 is constructed as illustrated in FIG. 1B, all notches 2A, 2B and 2C of the respective end plates 1B, the respective separators 10 and the collector plates 20 match with each other, and a concave groove is formed over the fuel battery 1 in the front-back direction.

As illustrated in FIGS. 1B and 1C, terminal parts 21 of the respective collector plates 20 are respectively projected from both ends in the front-back direction of concave grooves formed of the notches 2A, 2B and 2C on the upper side of the fuel battery 1. Each terminal part 21 is connected with a power supply wire 3 to be used for taking out generated electricity. One of these power supply wires 3 which lies on the front side is installed along a concave groove formed of the notches 2A, 2B and 2C.

As illustrated in FIG. 1C, an oxidation gas introduction port 1D is provided at one end side (i.e., left side) in a direction along a long side of the end plate 1B on the front side. Moreover, a fuel gas introduction port 1F is provided at one end side (i.e., left side) in a direction along a long side of the end plate 1B on the front side. The fuel gas introduction port 1F is provided at a position lower than the oxidation gas introduction port 1D. Here, the fuel battery 1 is of water cooling type. Cooling water, for example, is used as a cooling medium. A cooling water introduction port 1H is provided on the other end side (i.e., right side) in a direction along a long side of the end plate 1B on the front side. The cooling water introduction port 1H is provided at a position lower than the central position in the up-down direction of the end plate 1B on the front side.

On the other hand, as illustrated in FIG. 1A, an oxidation gas discharge port 1E is provided on the other end side (i.e., right side) in a direction along a long side of the end plate 1B on the back side. A fuel gas discharge port 1G is provided on the other end side (i.e., right side) in a direction along a long side of the end plate 1B on the back side. The fuel gas discharge port 1G is provided at a position upper than the oxidation gas discharge port 1E. Moreover, a cooling water discharge port 1I is provided on one end side (i.e., left side) in a direction along a long side of the end plate 1B on the back surface side. The cooling water discharge port 1I is provided at a position upper than the central position in the up-down direction of the end plate 1B on the back side.

<Separator>

Next, the separators 10, which constitute the aforementioned fuel battery 1, will be described with reference to FIGS. 2A, 2B, 3A, 3B and 4.

As illustrated in FIG. 4, one separator 10 is constructed by joining a first plate member 10A and a second plate member 10B with each other. The first plate member 10A and the second plate member 10B respectively have two surfaces. A first surface 10a of the first plate member 10A is drawn in FIG. 2A. The first surface 10a of the first plate member 10A is an outer surface on the cathode side where oxidation gas flows. A second surface 10d of the second plate member 10B is drawn in FIG. 2B. The second surface 10d of the second plate member 10B is an outer surface on the anode side where fuel gas flows. On the other hand, a second surface 10*b* of the first plate member 10A is drawn in FIG. 3A. A first surface 10*c* of the second plate member 10B is drawn in FIG. 3B. The second surface 10*b* of the first plate member 10A and the first surface 10*c* of the second plate member 10B are inner surfaces, which face each other in a state where one separator 10 is constructed. The aforementioned cooling water flows between the second surface 10*b* of the first plate member 10A and the first surface 10*c* of the second plate member 10B.

Figure 2A:
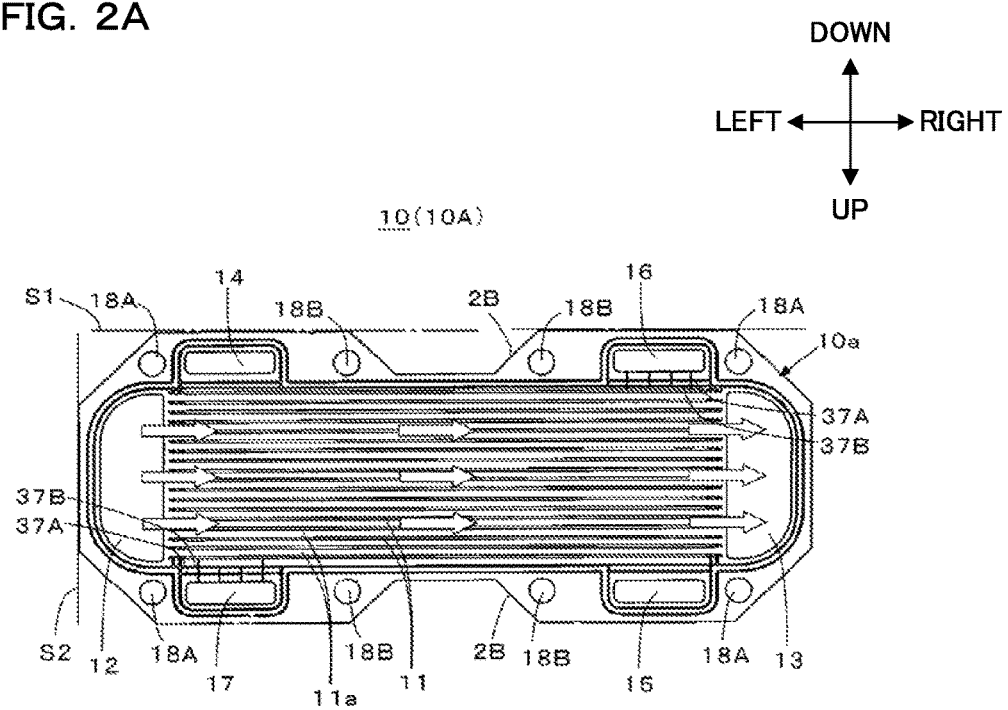
FIG. 2A is a schematic view illustrating a first surface on the cathode side of a first plate member, which constitutes a separator of a fuel battery.
Figure 2B:
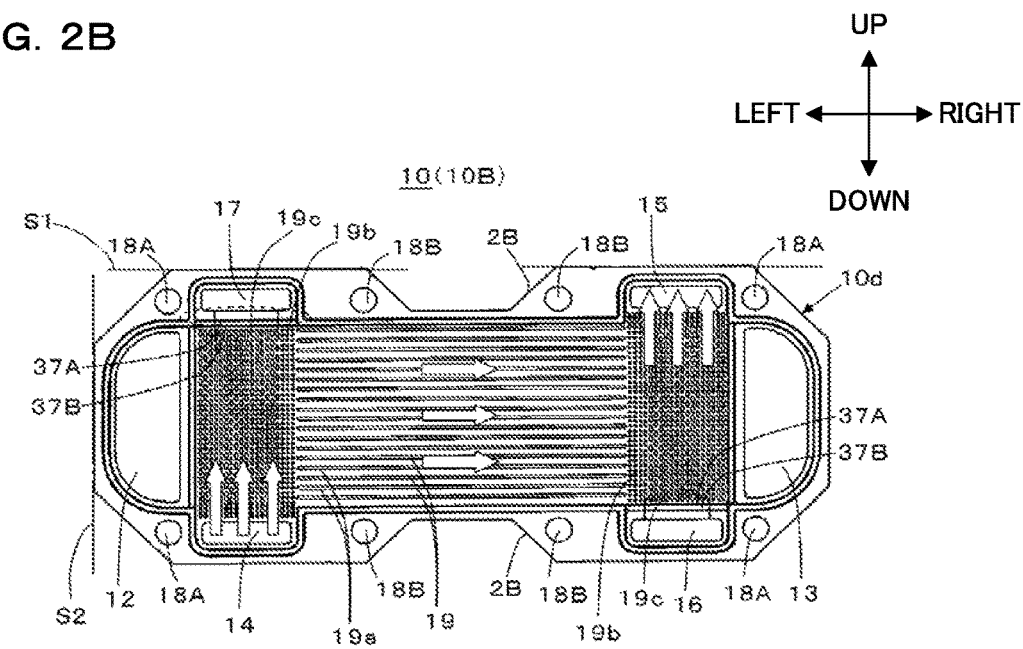
FIG. 2B is a schematic view illustrating a second surface on the anode side of a second plate member, which constitutes a separator of a fuel battery.

The first plate member 10A and the second plate member 10B are constituted of thin (e.g., thickness of approximately 1 mm to 2 mm) metal plates such as stainless steel, for example. By respectively processing these two thin metal plates by press work, for example, a convex/concave shape illustrated at the respective surfaces 10*a*, 10*b*, 10*c* and 10*d* in FIGS. 2A, 2B, 3A and 3B is formed. In a case where press work is conducted, the convex/concave shape formed on the first surface 10*a* of the first plate member 10A illustrated in FIG. 2A is directly inverted and becomes a convex/concave shape on the second surface 10*b* of the first plate member 10A illustrated in FIG. 3A. Similarly, a convex/concave shape formed on the second surface 10*d* of the second plate member 10B illustrated in FIG. 2B is directly inverted and becomes a convex/concave shape on the first surface 10*c* of the second plate member 10B illustrated in FIG. 3B.

As illustrated in FIG. 4, a pair of separators 10, which constitute a unit battery cell 100, sandwich both surfaces of the membrane electrode assembly 130. Regarding one of the pair of separators 10, the first surface 10*a* (i.e., outer surface on the cathode side) of the first plate member 10A illustrated in FIG. 2A contacts with a cathode electrode 133 of the membrane electrode assembly 130. A plurality of convex parts 11 and concave parts 11*a* are formed alternately on the first surface 10*a* of the first plate member 10A.

Moreover, regarding the other of the pair of separators 10 which constitute a unit battery cell 100, the second surface 10*d* (outer surface on the anode side) of the second plate member 10B illustrated in FIG. 2B contacts with an anode electrode 132 of the membrane electrode assembly 130 as illustrated in FIG. 4. A plurality of convex parts 19 and concave parts 19*a* are formed alternately on the second surface 10*d* of the second plate member 10B.

Figure 3A:
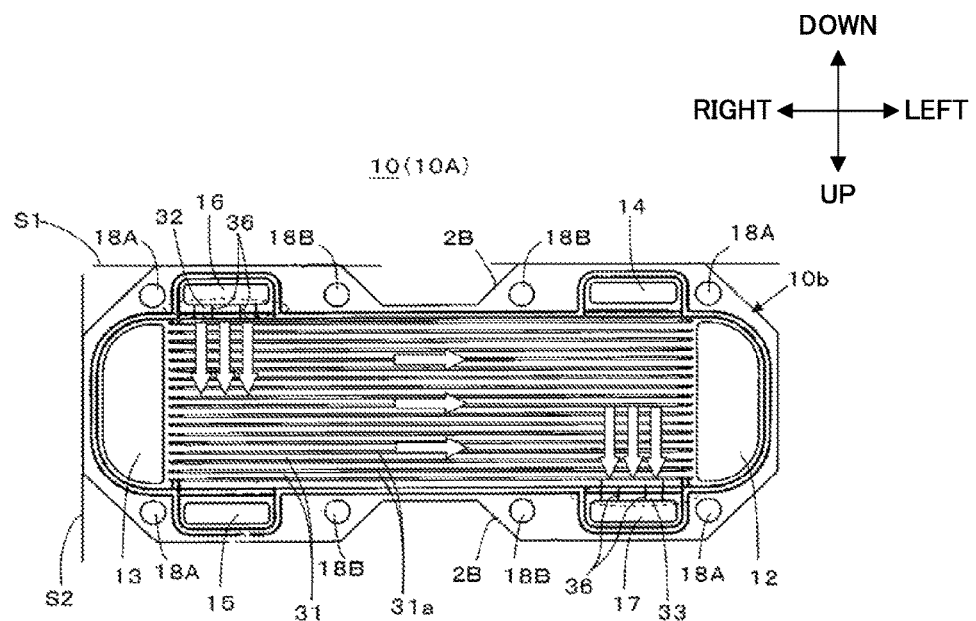
FIG. 3A is a schematic view illustrating a second surface which is a surface on the side opposite to the first surface of the first plate member that constitutes a separator.

Furthermore, a plurality of concave parts 31*a*, which are obtained by inverting the convex parts 11 of the first surface 10*a*, and a plurality of convex parts 31, which are obtained by inverting the concave parts 11*a* of the first surface 10*a*, are formed alternately on the second surface 10*b* of the first plate member 10A illustrated in FIG. 3A. On the other hand, a plurality of concave parts 39*a*, which are obtained by inverting the convex parts 19 of the second surface 10*d*, and a plurality of convex parts 39, which are obtained by inverting the concave parts 19*a* of the second surface 10*d*, are formed alternately on the first surface 10*c* of the second plate member 10B illustrated in FIG. 3B. As illustrated in FIG. 4, the concave parts 31*a* which are formed on the second surface 10*b* of the first plate member 10A and the concave parts 39*a* which are formed on the first surface 10*c* of the second plate member 10B are opposed to each other inside one separator 10.

<Flow Channel on Cathode Side, Notch, Through Hole>

In FIG. 2A, a first through hole 12 is formed to penetrate, in the front-back direction, the left end of the first plate member 10A, which constitutes the separator 10. A second through hole 13 is formed to penetrate, in the front-back direction, the right end of the first plate member 10A. The plurality of convex parts 11 are provided in parallel and at intervals in the middle in the right-left direction of the first plate member 10A. The plurality of convex parts 11 are extended from the first through hole 12 to the second through hole 13 in the right-left direction. As illustrated in FIG. 4, each of the plurality of convex parts 11 is projected from the first surface 10*a* of the first plate member 10A toward the front side. The top part of each convex part 11 contacts with the cathode electrode 133 of the membrane electrode assembly 130. Moreover, concave parts 11*a* are respectively formed between respective convex parts 11. The bottom part of each of the plurality of concave parts 11*a* and the cathode electrode 133 are separated from each other. Oxidation gas supplied to the cathode electrode 133 flows from the first through hole 12, flows between the plurality of convex parts 11, that is, flows through the plurality of concave parts 11*a*, and is discharged from the second through hole 13. That is, a plurality of oxidation gas flow channel walls, which define a flow channel of oxidation gas, are formed of the plurality of convex parts 11 and the plurality of concave shapes 11*a*.

As illustrated in FIG. 2A, the first plate member 10A has an outer shape corresponding to each aforementioned end plate 1B and has an elongate shape in the right-left direction. The first plate member 10A has the first sides S1, which are the pair of long sides opposed to each other, and second sides S2, which are a pair of short sides opposed to each other. In addition, four bolt through holes 18A, 18B, 18B and 18A are provided at equal intervals respectively along the first sides S1 of the separator 10. The aforementioned eight bolts 1C are respectively inserted into these bolt through holes 18A and 18B.

The aforementioned trapezoidal notches 2B are respectively formed in the middle in the right-left direction of the first sides S1 of the first plate member 10A. These notches 2B are formed between two bolt through holes 18B and 18B, which are adjacent to each other with the center in the right-left direction of the first sides S1 being sandwiched therebetween, in the right-left direction.

A first through hole 14 is formed to penetrate, in the front-back direction, a lower position (i.e., left lower side) on one end side of the first plate member 10A. Moreover, a second through hole 15 is formed to penetrate, in the front-back direction, an upper position (i.e., right upper side) of the other end side of the first plate member 10A. The first through hole 14 is formed between two of a bolt through hole 18A and a bolt through hole 18B which lie on the left lower side of the first plate member 10A. The second through hole 15 is formed between two of a bolt through hole 18A and a bolt through hole 18B which are formed on the right upper side of the first plate member 10A.

A first through hole 16 is formed to penetrate, in the front-back direction, a lower position (i.e., right lower side) on the other end side of the first plate member 10A. Moreover, a second through hole 17 is formed to penetrate, in the front-back direction, an upper position (i.e., left upper side) on one end side of the first plate member 10A. The first through hole 16 is formed between two of a bolt through hole 18A and a bolt through hole 18B which are formed on the right lower side of the first plate member 10A. The second through hole 17 is formed between a bolt through hole 18A and a bolt through hole 18B which are formed on the left upper side of the first plate member 10A.

As illustrated in FIGS. 2A and 4, gasket lines 37A and 37B projected toward the front side are formed on the first surface 10*a* of the first plate member 10A. The gasket lines 37A and 37B surround the outer circumference of the plurality of convex parts 11, the plurality of concave parts 11a, the first through hole 12 and the second through hole 13 without any space.

<Flow Channel on Anode Side>

In FIG. 2B, a plurality of convex parts 19 are provided in parallel and at intervals in the middle of the second plate member 10B, which constitutes the separator 10. The plurality of convex parts 19 are extended in the right-left direction. As illustrated in FIG. 4, each of the plurality of convex parts 19 is projected from the second surface 10d of the second plate member 10B toward the back side. The top part of each convex part 19 contacts with the anode electrode 132 of the membrane electrode assembly 130. Moreover, concave shapes 19a are respectively formed between respective convex parts 19. The bottom part of each of the plurality of concave parts 19a and the anode electrode 132 are separated from each other. The width in the right-left direction of a region where the plurality of convex parts 19 are formed is smaller than the width in the right-left direction of a region where the plurality of convex parts 11 are formed in the first plate member 10A. A pair of a diffusion region 19b and a transition region 19c are respectively formed between the left end of the plurality of convex parts 19 and the first through hole 12 and between the right end of the plurality of convex parts 19 and the second through hole 13.

A number of elliptical convex parts projected from the second surface 10d of the second plate member 10B toward the back side are formed in the transition regions 19c. All of these elliptical convex parts are extended in a direction of the second side S2 (i.e., up-down direction), which is a short side of the second plate member 10B. A number of circular convex parts projected from the second surface 10d of the second plate member 10B to the back side are formed in the diffusion regions 19b. The top part of each of the plurality of elliptical convex parts formed in the transition regions 19c and the top part of each of the plurality of circular convex parts formed in the diffusion regions 19b respectively contact with the anode electrode 132. Fuel gas supplied to the anode electrode 132 flows in from the first through hole 14, and the inflow direction is transited in the up-down direction and the right-left direction by the transition region 19c on the left side. The fuel gas is diffused equally in the up-down direction by the circular convex parts provided in the diffusion region 19b on the left side. In addition, fuel gas then flows between the plurality of convex parts 19, that is, flows through the plurality of concave parts 19a. Fuel gas, which has flown through the plurality of concave parts 19a, flows through the diffusion region 19b on the right side and the transition region 19c on the right side, and is discharged from the second through hole 15. That is, a plurality of fuel gas flow channel walls, which define a flow channel of fuel gas, are formed of the plurality of convex parts 19, the plurality of concave parts 19a, the right and left diffusion regions 19b, and the right and left transition regions 19c. It is to be noted that, instead of the right and left diffusion regions 19b and the right and left transition regions 19c, the left ends of the plurality of concave parts 19a and the plurality of convex parts 19 may be bent downward at a right angle and extended to the first through hole 14, and the right ends of the plurality of concave parts 19a and the plurality of convex parts 19 may be bent upward at a right angle and extended to the second through hole 15, so that a plurality of serpentine-type fuel gas channel walls are formed.

The gasket lines 37A and 37B projected toward the back side are formed on the second surface 10d of the second plate member 10B. The gasket lines 37A and 37B surround the outer circumference of the plurality of convex parts 19, the plurality of concave parts 19a, the right and left diffusion regions 19b, the right and left transition regions 19c, the first through hole 14 and the second through hole 15 without any space.

<Membrane Electrode Assembly>>

In FIG. 4, the membrane electrode assembly 130 has a solid polymer electrolyte film 131, the anode electrode 132 and the cathode electrode 133. The solid polymer electrolyte film 131 is proton conductive, in a hydrous state. The solid polymer electrolyte film 131 is constituted of fluorine polymer having a sulfonic acid group, such as Nafion® (Registered Trademark), for example.

The cathode electrode 133 contacts with one surface of the solid polymer electrolyte film 131. The cathode electrode 133 has a catalyst layer 133a and a gas diffusion layer 133b. The gas diffusion layer 133b is electrically conductive and is permeable to oxidation gas (e.g., air). The gas diffusion layer 133b is constituted of, for example, carbon paper (also referred to as "carbon microfiber") or the like. The catalyst layer 133a is provided between one surface of the membrane electrode assembly 130 and the gas diffusion layer 133b. The catalyst layer 133a includes catalyst, which is composed mainly of carbon powder carrying platinum-based metal catalyst. The catalyst layer 133a is formed by applying paste, which is obtained by dispersing catalyst in organic solvent, to carbon paper, which constitutes the gas diffusion layer 133b.

The anode electrode 132 contacts with the other surface of the solid polymer electrolyte film 131. The anode electrode 132 has a catalyst layer 132a and a gas diffusion layer 132b. The gas diffusion layer 132b is electrically conductive and is permeable to fuel gas (e.g., hydrogen). The gas diffusion layer 132b is constituted of, for example, carbon paper or the like. The catalyst layer 132a is provided between the other surface of the membrane electrode assembly 130 and the gas diffusion layer 132b. The catalyst layer 132a includes catalyst, which is composed mainly of carbon powder carrying platinum-based metal catalyst. The catalyst layer 132a is formed by applying paste, which is obtained by dispersing catalyst in organic solvent, to carbon paper, which constitutes the gas diffusion layer 132b.

<Gasket>

In FIG. 4, the gasket 120a is adjacent to the outer circumference of the cathode electrode 133 and contacts with one surface of the solid polymer electrolyte film 131. The gasket 120a is constituted of an elastic body such as elastomer or rubber processed to be thin. A plurality of through holes are formed at the gasket 120a. The plurality of through holes are formed at positions corresponding to the first through hole 12, the second through hole 13, the first through hole 14, the second through hole 15, the first through hole 16, and the second through hole 17 of the separator 10, and regions where the plurality of convex parts 11 and concave parts 11a are formed on the first surface 10a of the first plate member 10A. The gasket 120a is pressed by the gasket lines 37A and 37B which are formed on the first surface 10a of the first plate member 10A. The gasket 120a prevents air, which flows in a flow channel of oxidation gas, from leaking from a unit battery cell 100 to the outside.

The gasket 120b is adjacent to the outer circumference of the anode electrode 132 and contacts with the other surface of the solid polymer electrolyte film 131. The gasket 120b is constituted of an elastic body such as elastomer or rubber processed to be thin. A plurality of through holes are formed at the gasket 120b. The plurality of through holes are formed at positions corresponding to the first through hole 12, the second through hole 13, the first through hole 14, the second through hole 15, the first through hole 16, and the second through hole 17 of the separator 10, and regions where the plurality of convex parts 19, the plurality of concave parts 19a, the right and left diffusion regions 19b, and the right and left transition regions 19c are formed on the second plate member 10B. The gasket 120b is pressed by the gasket lines 37A and 37B formed on the second surface 10d of the second plate member 10B. The gasket 120b prevents hydrogen, which flows in a flow channel of fuel gas, from leaking from a unit battery cell 100 to the outside.

<Operation of Fuel Battery>

Hydrogen as fuel gas is supplied from the fuel gas supply source through piping to the fuel gas introduction port 1F. The fuel gas supply source is, for example, a high-pressure hydrogen cylinder, hydrogen storage alloy or the like. Hydrogen gas, which has been supplied from the fuel gas introduction port 1F to the inside of the stack 1A, flows into the first through hole 14 of each of the plurality of unit battery cells 100 laminated in the front-back direction. The hydrogen gas flows from the first through hole 14 into a flow channel of fuel gas, that is, a region which is formed of a plurality of convex parts 19, a plurality of concave parts 19a, the right and left diffusion regions 19b, and the right and left transition regions 19c on the second surface 10d of the second plate member 10B that constitutes the separator 10, and the anode electrode 132. Hydrogen is diffused in the surface direction (i.e., up-down and right-left directions) of the membrane electrode assembly 130 by the diffusion layer 132b of the anode electrode 132, and contacts with the catalyst layer 132a of the anode electrode 132. Hydrogen gas, which has contacted with the catalyst layer 132a, is separated into a hydrogen ion and an electrode by catalyst included in the catalyst layer. Hydrogen ions are conducted by the solid polymer film 131 and reach the catalyst layer 133a of the cathode electrode 133. On the other hand, electrons are taken out from a terminal part 21 on the front side. Hydrogen gas, which has contacted with the anode electrode 132, is discharged from the second through hole 15 through the fuel gas discharge port 1G to the outside of the stack 1A.

On the other hand, air as oxidation gas is supplied from an unillustrated air compressor through piping to the oxidation gas introduction port 1D. Air, which has been supplied to the oxidation gas introduction port 1D, flows into a first through hole 12 of each of a plurality of unit battery cells 100 laminated in the front-back direction. Air flows from the first through hole 12 into a flow channel of oxidation gas, that is, a region, which is formed of the plurality of convex parts 11, the plurality of concave shapes 11a and the cathode electrode 133. Air is diffused in the surface direction (i.e., up-down and right-left directions) of the membrane electrode assembly 130 by the diffusion layer 133b of the cathode electrode 133, and contacts with the catalyst layer 133a of the cathode electrode 133. Oxygen included in air is caused by catalyst included in the catalyst layer 133a to react with hydrogen ions, which has been conducted by the solid polymer film 131, and with electrodes, which have been taken out from the terminal part 21 on the front side and conducted through an external load from a terminal part 21 on the back surface side, and generates water. This electrode transfer generates electric power. Air, which has contacted with the cathode electrode 133, reaches the second through hole 13 together with the generated water, and is discharged from the stack 1A through the oxidation gas discharge port 1E.

<Cooling Water Flow Channel>

As described above, the second surface 10b of the first plate member 10A and the first surface 10c of the second plate member 10B are inner surfaces, which face each other in a state where one separator 10 is constructed. Cooling water, which functions as a cooling medium, flows between the second surface 10b of the first plate member 10A and the first surface 10c of the second plate member 10B. The following description will explain a convex/concave shape formed on the second surface 10b of the first plate member 10A and on the first surface 10c of the second plate member 10B.

As illustrated in FIGS. 3A and 4, the first plate member 10A of two metal plates, which constitute the separator 10, lies on the front side. The plurality of convex parts 31, which are convex to the back side, and the plurality of concave parts 31a, which are concave to the front side, are formed on the second surface 10b of the first plate member 10A. The convex parts 31 correspond to the concave parts 11a formed on the first surface 10a of the first plate member 10A. The concave parts 31a correspond to the convex parts 11 formed on the first surface 10a of the first plate member 10A.

Figure 3B:
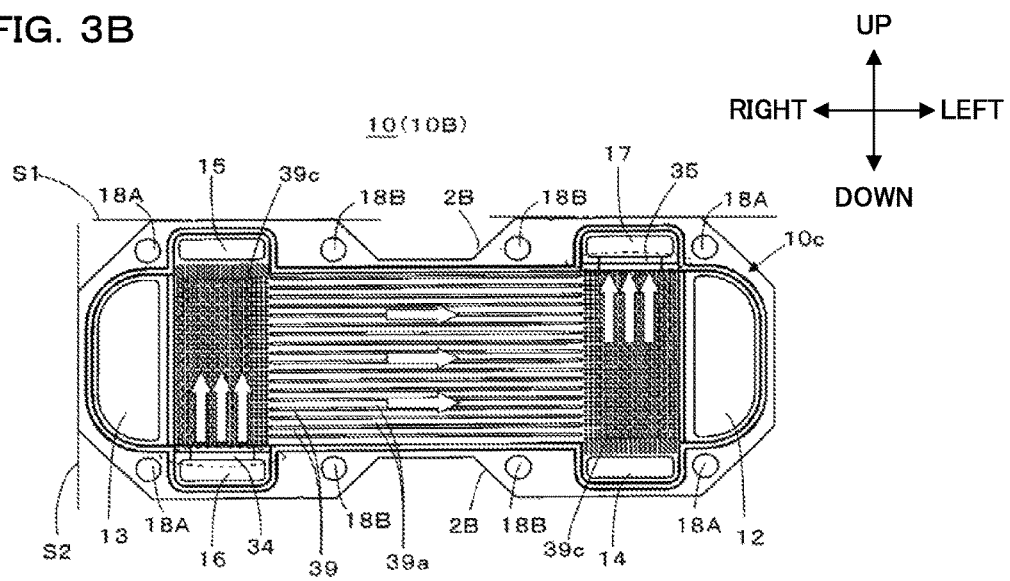
FIG. 3B is a schematic view illustrating a first surface which is a surface on the side opposite to the second surface of the second plate member that constitutes a separator.

As illustrated in FIGS. 3B and 4, the second plate member 10B of two metal plates, which constitute the separator 10, lies on the back side. The plurality of convex parts 39, which are convex to the front side, and the plurality of concave parts 39a, which are concave to the back side, are formed on the first surface 10c of the second plate member 10B. The convex parts 39 correspond to the concave parts 19a formed on the second surface 10d of the second plate member 10B. The concave parts 39a correspond to the convex parts 19 formed on the second surface 10d of the second plate member 10B.

When the second surface 10b of the first plate member 10A and the first surface 10c of the second plate member 10B are bonded with each other, the top part of each convex part 31 and the top part of each convex part 39 are opposed and contact to each other. Cooling water flows through a region, which is formed of the concave parts 31a and the concave parts 39a and is sandwiched by the convex parts 31 and the convex parts 39 adjacent to each other in the up-down direction. That is, a plurality of cooling medium flow channel walls, which define a flow channel of cooling water, are composed of the convex parts 31, the convex parts 39, the concave parts 31a and the concave parts 39a.

Here, a region 39c which lies on the right side of the first surface 10c of the second plate member 10B illustrated in FIG. 3B corresponds to the transition region 19c which lies on the left side of the second surface 10d of the second plate member 10B illustrated in FIG. 2B. Similarly, a region 39c which lies on the left side of the first surface 10c of the second plate member 10B illustrated in FIG. 3B corresponds to the transition region 19c which lies on the right side of the second surface 10d of the second plate member 10B illustrated in FIG. 2B.

A number of elliptical convex parts formed in the transition region 19c illustrated in FIG. 2B are inverted into a number of elliptical concave parts formed in the region 39c illustrated in FIG. 3B. The length in the direction of the second side S2 (i.e., up-down direction) of an elliptical concave part, which is formed in the region 39c, is set equal to or larger than the length from one concave part 31a to the other concave part 31a which are adjacent to each other and formed on the second surface 10b of the first plate member 10A illustrated in FIG. 3A. With such a structure, in the case where the first surface 10c of the second plate member 10B and the second surface 10b of the first plate member 10A are bonded with each other and the separator 10 is constructed, an elliptical concave part formed in the region 39c of the first surface 10c overlaps with two adjacent concave parts 31a on the second surface 10b, so that an inner flow channel which establishes communication in the up-down and right-left directions is formed. As a result, cooling water, which has been supplied from the first through hole 16 to the inside of the separator 10, flows through the elliptical concave part in the region 39c on the right side in FIG. 3B and into the right end of the concave part 31a illustrated in FIG. 3A. Then, after reaching the left end of the concave part 31a, cooling water flows through an elliptical concave part in the region 39c on the left side in FIG. 3B and is discharged from the second through hole 17.

<Cooling Water Passage Part>

Regarding the separator 10, in the case where the second surface 10b of the first plate member 10A and the first surface 10c of the second plate member 10B are bonded with each other, a part of the second surface 10b and a part of the first surface 10c are separated from each other and a cooling water passage part (cooling medium passage part) is formed. The cooling water passage part is space which is formed when the second surface 10b of the first plate member 10A and the first surface 10c of the second plate member 10B are separated from each other. However, for convenience of explanation, a part of the second surface 10b and a part of the first surface 10c, which define the cooling water passage part, are represented as a cooling water passage part in FIGS. 3A, 3B, 5A, 5B, 6A and 6B.

On the second surface 10b of the first plate member 10A illustrated in FIG. 3A, a first cooling water passage part 32 is formed in a region between the first through hole 16 and a lower right convex part 31 nearest to this first through hole 16. Similarly, a second cooling water passage part 33 is formed in a region between the second through hole 17 and an upper left convex part 31 nearest to this second through hole 17. The first cooling water passage part 32 and the second cooling water passage part 33 illustrated in FIG. 3A are an example of a cooling medium passage part.

On the first surface 10c of the second plate member 10B illustrated in FIG. 3B, a first cooling water passage part 34 is formed in a region between the first through hole 16 and the lower end of the region 39c on the right side. Similarly, a second cooling water passage part 35 is formed in a region between the second through hole 17 and the upper end of the region 39c on the left side. The first cooling water passage part 34 and the second cooling water passage part 35 illustrated in FIG. 3B are an example of a cooling medium passage part.

One separator 10 is constructed by bonding the second surface 10b of the first plate member 10A and the first surface 10c of the second plate member 10B with each other. Here, the first cooling water passage part 32 of the second surface 10b and the first cooling water passage part 34 of the first surface 10c are separated from each other, and space where cooling water can flow is formed (see FIG. 5B). Similarly, the second cooling water passage part 33 of the second surface 10b and the second cooling water passage part 35 of the first surface 10c are separated from each other, and space where cooling water can flow is formed. Space formed of the two first cooling water passage parts 32 and 34 establishes communication between the first through hole 16 and the right end of the aforementioned cooling water flow channel wall. On the other hand, space formed of the two second cooling water passage parts 33 and 35 establishes communication between the second through hole 17 and the left end of the aforementioned cooling water flow channel wall.

Cooling water as a cooling medium is supplied from an unillustrated pump through piping to the cooling water introduction port 1H. Cooing water, which has been supplied from the cooling water introduction port 1H to the inside of the stack 1A, flows into the first through hole 16 of each of the plurality of unit battery cells 100 laminated in the front-back direction. Cooling water, which has flown into the first through hole 16, flows through space which is formed of the two first cooling water passage parts 32 and 34 into the right end of a flow channel of cooling water. As described above, a flow channel of cooling water is a region which is defined by a cooling water flow channel wall that is composed of the convex part 31, the convex part 39, the concave part 31a and the concave part 39a, between the second surface 10b of the first plate member 10A and the first surface 10c of the second plate member 10B. Cooling water flows from the right end to the left end of the flow channel of cooling water. Cooling water, which has reached the left end of the flow channel of cooling water, flows through space which is formed of the two second cooling water passage parts 33 and 35 into the second through hole 17. Cooling water, which has flown into the second through hole 17, is discharged from the cooling water discharge part 1I to the outside.

<Projection According to First Embodiment>

As described above, cooling water in the separator 10 flows through space which is formed of the first cooling water passage parts 32 and 34, and space which is formed of the second cooling water passage parts 33 and 35. However, the separator 10 is composed of the first plate member 10A and the second plate member 10B, which are two thin metal plates illustrated in FIGS. 2A, 2B, 3A and 3B. Moreover, the stack 1A is composed of a plurality of laminated separators 10. The separator 10 is therefore subject to pressure in the lamination direction (i.e., front-back direction) generated by fastening of the eight bolts 1C. If the first cooling water passage parts 32 and 34 and the second cooling water passage parts 33 and 35 lie around the bolt through holes 18A and 18B as illustrated in FIGS. 3A and 3B, for example, pressure in the lamination direction with a relatively large ratio is applied to the first cooling water passage parts 32 and 34 and the second cooling water passage parts 33 and 35. Moreover, the gasket lines 37A and 37B illustrated in FIGS. 2A and 2B are provided on surfaces on opposite sides corresponding to the first cooling water passage parts 32 and 34 and the second cooling water passage parts 33 and 35, for example. Repulsive force applied from the gaskets 120a and 120b to the gasket lines 37A and 37B is therefore applied directly to the first cooling water passage parts 32 and 34 and the second cooling water passage parts 33 and 35. If such pressure or repulsive force deforms the part of the first cooling water passage parts 32 and 34 and the part of the second cooling water passage parts 33 and 35 in the thin metal plates which constitute the separator 10, space where cooling water can flow is closed. In order to solve such a problem, a plurality of projections 36 are respectively formed at the first cooling water passage part 32 and the second cooling water passage part 33 of the first plate member 10A illustrated in FIG. 3A.

Figure 5A:
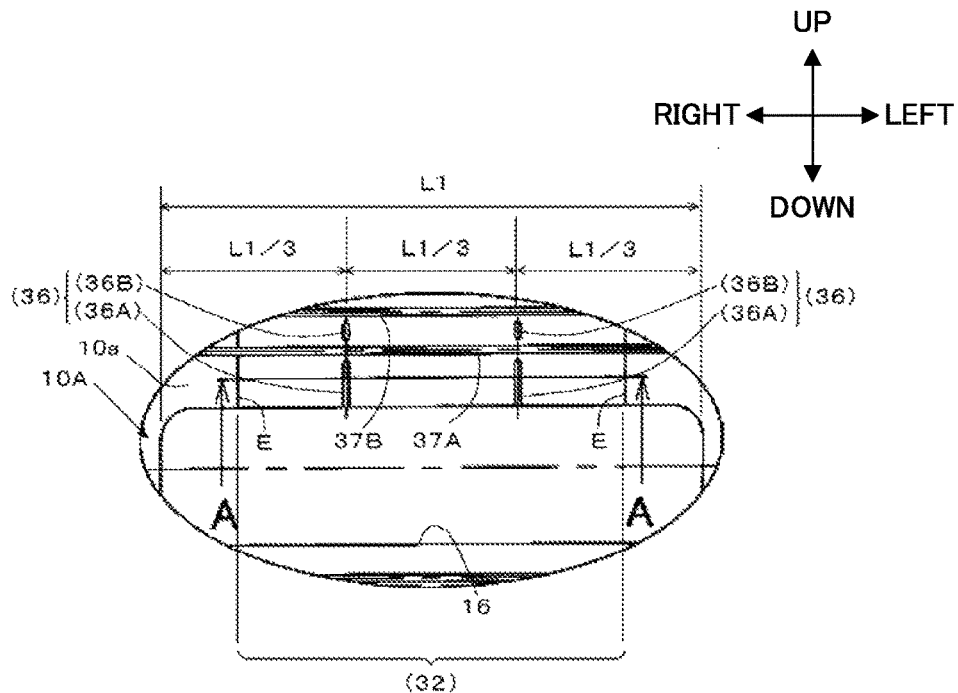
FIG. 5A is an enlarged view of the periphery of a through hole, through which cooling water flows, in a separator according to an embodiment.
Figure 5B:
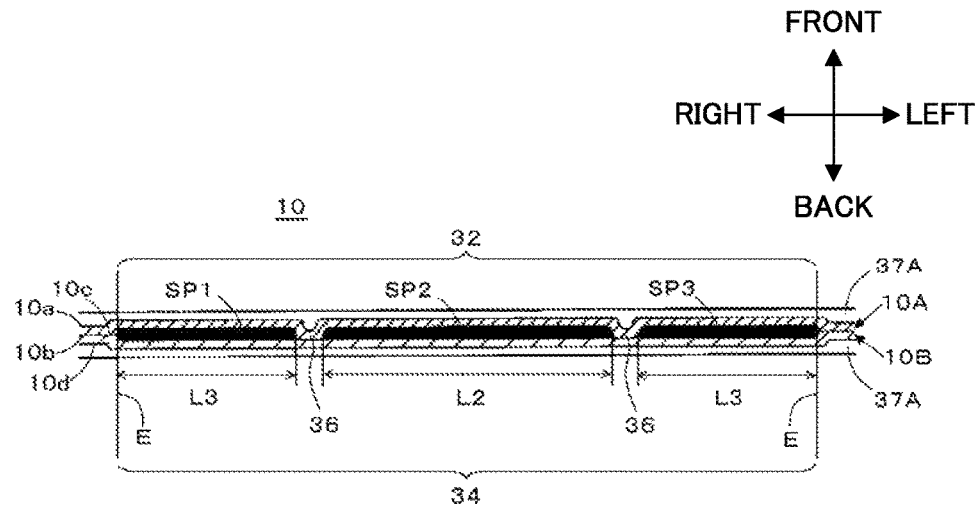
FIG. 5B is a sectional view cut along the line A-A in FIG. 5A.

The following description will explain the projections 36 according to First Embodiment of the present disclosure with reference to FIGS. 3A, 5A and 5B. It is to be noted that projections 36 provided at the first cooling water passage part 32 and projections 36 provided at the second cooling water passage part 33 have the same structure as illustrated in FIG. 3A. Therefore, projections 36 provided at the first cooling water passage part 32 will be described in First Embodiment. Description of projections 36 provided at the second cooling water passage part 33 will be omitted.

<Structure of Projection>

As illustrated in FIGS. 3A and 5A, two projections 36 are provided at the first cooling water passage part 32 by press work. The projections 36 are extended in the up-down direction. One projection 36 is composed of a first projection part 36A and a second projection part 36B. The length of the first projection part 36A in the up-down direction is larger than the length of the second projection part 36B in the up-down direction. The first projection part 36A and the second projection part 36B are formed on the same line along the up-down direction. As illustrated in FIG. 5B, a projection 36 is projected from the second surface 10b of the first plate member 10A toward the first cooling water passage part 34 formed on the first surface 10c of the second plate member 10B. A projection 36 of First Embodiment has a height from the second surface 10b of the first plate member 10A to the first cooling water passage part 34 formed on the first surface 10c of the second plate member 10B.

Two projections 36 are provided side by side in the longer direction of the first cooling water passage part 32. Cooling water flows through the first cooling water passage part 32 in the short direction (i.e., up-down direction) thereof. That is, the two projections 36 are provided side by side in a direction crossing the passage direction of the cooling water (i.e., right-left direction). Moreover, each projection 36 is extended straight in the up-down direction along the passage direction of the cooling water. Accordingly, none of the projections 36 blocks passage of cooling water.

Here, as illustrated in FIGS. 3A and 5A, two gasket lines 37A and 37B are provided in parallel along the longer direction of the first cooling water passage part 32 at positions corresponding to the first cooling water passage part 32 on the first surface 10a of the first plate member 10A. The gasket lines 37A and 37B are protrusions for supporting a part of the gasket 120a. As illustrated in FIG. 4, the gasket lines 37A and 37B constitute protrusions, which are convex toward the front side, on the first surface 10a of the first plate member 10A. On the other hand, the gasket lines 37A and 37B constitute grooves, which are obtained by inverting the protrusions and are concave toward the front side, on the second surface 10b of the first plate member 10A.

As illustrated in FIG. 5A, the two projections 36 are extended in a direction crossing the gasket lines 37A and 37B. Each projection 36 is formed to be divided into the first projection part 36A and the second projection part 36B with the gasket lines 37A being sandwiched therebetween.

As illustrated in FIG. 5A, the lower end of the first projection part 36A is provided continuously to an edge part which defines the first through hole 16. The upper end of the first projection part 36A finishes in front of the gasket line 37A and does not cross the gasket line 37A. The second projection part 36B lies between the gasket line 37A and the gasket line 37B. The lower end of the second projection part 36B finishes in front of the gasket line 37A and does not cross the gasket line 37A. The upper end of the second projection part 36B finishes in front of the gasket line 37B and does not cross the gasket line 37B.

The projection 36 is not provided in a region upper than the gasket line 37B in the first cooling water passage part 32. That is, every upper end of the projection part 36 is separated from a cooling water flow channel wall, which is composed of the convex parts 31, the convex parts 39, the concave parts 31a and the concave parts 39a illustrated in FIGS. 3A and 3B.

The projections 36 having such a structure forms three spaces SP1, SP2 and SP3 illustrated in FIG. 5B between the respective first cooling water passage parts 32 and 34, when the second surface 10b of the first plate member 10A and the first surface 10c of the second plate member 10B are bonded with each other. Cooling water, which has flown in from the first through hole 16, flows through the three spaces SP1, SP2 and SP3 from the lower side to the upper side to one end (i.e., right end) of a cooling water flow channel wall, which is composed of the convex parts 31, the convex parts 39, the concave parts 31a and the concave parts 39a illustrated in FIGS. 3A and 3B.

<Position of Projection>

As illustrated in FIGS. 5A and 5B, the width of the first cooling water passage part 32 in the longer direction (i.e., right-left direction) is defined by two end parts E. The width L1 of the first through hole 16 in the longer direction is larger than the width of the first cooling water passage part 32 in the longer direction. Two projections 36 of First Embodiment are provided at positions to equally divide the width L1 of the first through hole 16 in the longer direction into three. The interval L2 between two projections 36 including the center of the width of the first cooling water passage part 32 in the longer direction is therefore larger than the interval L3 between an end part E of the first cooling water passage part 32 in the longer direction and a projection 36 adjacent to this end part E. The interval L2 between the two projections 36 is set equal to or larger than 5 mm, and equal to or smaller than 20 mm. Similarly, the interval L3 between a projection 36 and an end part E is set equal to or larger than 5 mm, and equal to or smaller than 20 mm.

<Projection According to Second Embodiment>

Next, projections 38 according to Second Embodiment of the present disclosure will be explained with reference to FIGS. 6A and 6B. In Second Embodiment, like codes will be attached to components similar to those of Embodiment 1, and detailed description thereof will be omitted.

Figure 6A:
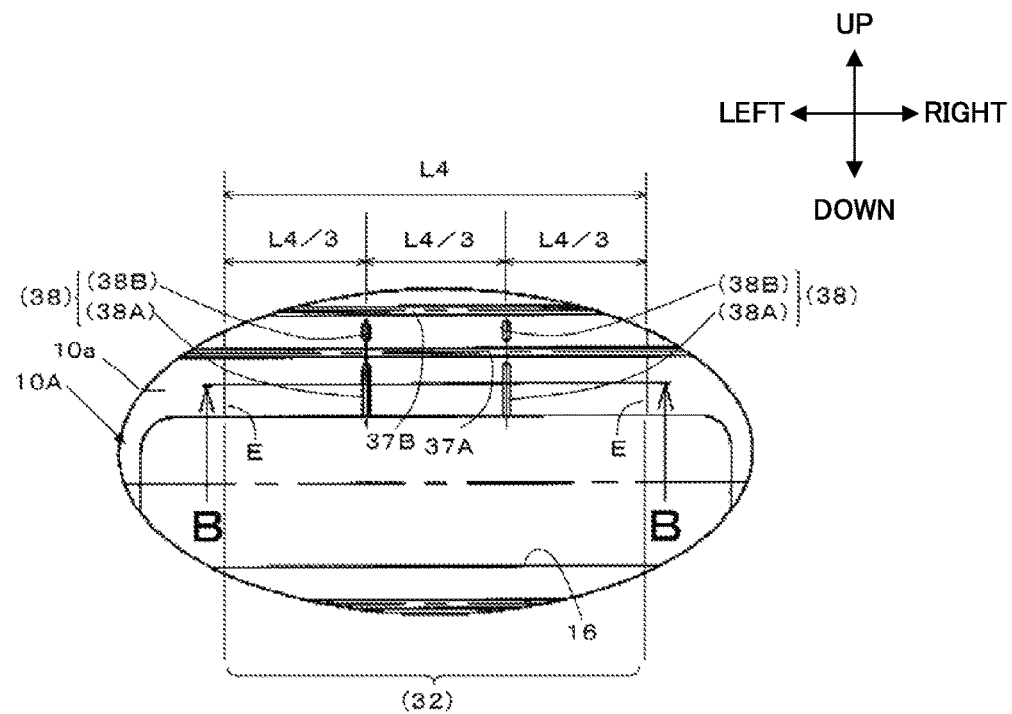
FIG. 6A is an enlarged view of the periphery of a through hole, through which cooling water flows, in an example of non-limiting separator according to another embodiment.
Figure 6B:
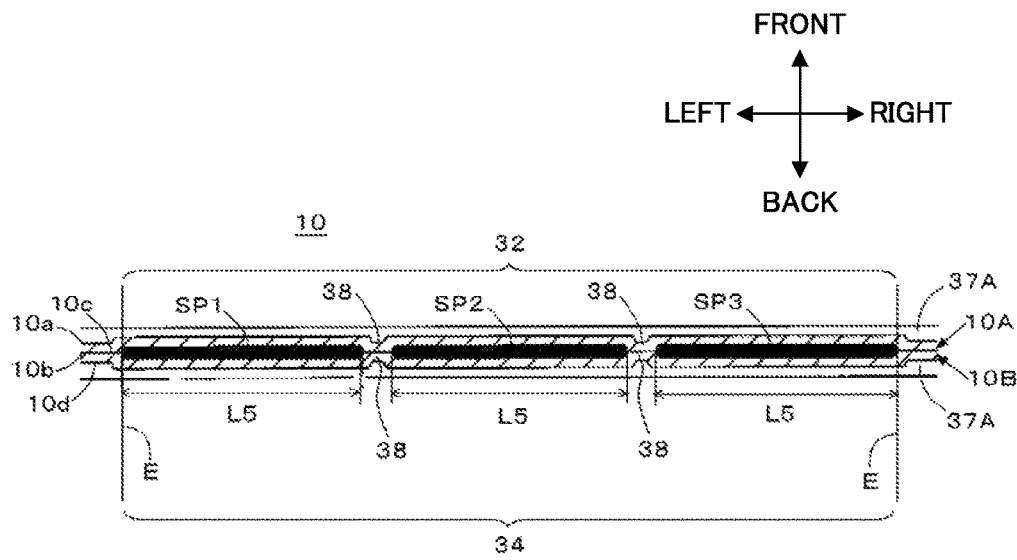
FIG. 6B is a sectional view cut along the line B-B in FIG. 6A.

In Second Embodiment, two projections 38 are provided at both of the first cooling water passage part 32, which is formed on the second surface 10b of the first plate member 10A, and the first cooling water passage part 34, which is formed on the first surface 10c of the second plate member 10B, as illustrated in FIG. 6B. Projections 38 provided at the first plate member 10A and projections 38 provided at the second plate member 10B correspond to each other. When the second surface 10b of the first plate member 10A and the first surface 10c of the second plate member 10B are bonded with each other, corresponding projections 38 come into contact with each other. This forms three spaces SP1, SP2 and SP3 between the first cooling water passage part 32 of the first plate member 10A and the first cooling water passage part 34 of the second plate member 10B. Cooling water, which has flown into the first through hole 16, flows through these three spaces SP1, SP2 and SP3 from the lower side to the upper side to one end (i.e., right end) of a cooling water flow channel wall, which is composed of the convex parts 31, the convex parts 39, the concave parts 31a and the concave parts 39a illustrated in FIGS. 3A and 3B. The height of each projection 38 is ½ of the height of these three spaces SP1, SP2 and SP3.

As illustrated in FIG. 6A, the projections 38 provided at the first plate member 10A are provided at positions, which equally divide the width L4 of the cooling medium passage part 32 in the longer direction (i.e., right-left direction) into three. Therefore, the interval L5 between the two projections 38 including the center of the width of the first cooling water passage part 32 in the longer direction is equal to the interval L5 between an end part E of the first cooling water passage part 32 and a projection 38 adjacent to this end part E as illustrated in FIG. 6B. Both of these intervals L5 are set equal to or larger than 5 mm, and equal to or smaller than 20 mm. Projections 38 provided at the second plate member 10B have the same structure as that of the aforementioned projections 38 provided at the first plate member 10A.

<Collector Plate>

Next, a collector plate 20, which constitutes the aforementioned fuel battery 1 of Second Embodiment, will be described with reference to FIG. 7.

In FIG. 7, the collector plate 20 is constituted of a metal plate having the same outer shape as that of the aforementioned separator 10. First through holes 22, 24 and 26 and second through holes 23, 25 and 27 are provided to have outer shapes and positions corresponding to those of respective the first through holes 12, 14 and 16 and the second through holes 13, 15 and 17 illustrated in FIG. 2B. The collector plate 20 is also provided with eight bolt through holes 28A and 28B having outer shapes and positions corresponding to those of the respective bolt through holes 18A and 18B illustrated in FIG. 2B.

Here, unlike the aforementioned separator 10, a terminal part 21 is provided continuously to an upper notch 2C of the collector plate 20. This terminal part 21 is projected in a direction crossing a first side S1, which is a long side of the collector plate 20. In Second Embodiment, the projection length of the terminal part 21 is set equal to the height of the first side S1 (see the dotted line in the figure), so that the terminal part 21 is not projected from the notch 2C.

Moreover, the formation position of the terminal part 21 in Second Embodiment is shifted from the center (see the long dashed short dashed line in the figure) in the right-left direction of the notch 2C to the left side. With such a structure, installation space L for power supply wiring 3 (see FIGS. 1A to 1C) is formed in the notch 2C, and power supply wiring 3 connected with the terminal part 21 can be kept in the notch 2C in a favorable manner.

Although Second Embodiment has a structure wherein the collector plate 20 is not provided with any convex-concave shape to constitute a flow channel wall of oxidation gas or fuel gas, it is to be noted that the present embodiment may have a structure that the collector plate 20 is provided with flow channel walls of oxidation gas and fuel gas formed on any one surface, since the collector plate 20 is laminated on both ends of the stack 1a, which is laminate of unit battery cells.

<Effect>

Separators 10 of First Embodiment and Second Embodiment have structures wherein projections 36 and 38 illustrated in FIGS. 5A and 5B or FIGS. 6A and 6B are provided. The projections 36 and 38 are interposed in space between the first cooling water passage part 32, which is formed on the second surface 10b of the first plate member 10A, and the first cooling water passage part 34, which is formed on the first surface 10c of the second plate member 10B. The projections 36 and 38 withstand pressure from the separator 10 in the lamination direction caused by fastening of the eight bolts 1C, and repulsive force applied from the gaskets 120a and 120b to the gasket lines 37A and 37B, and suppress deformation, such as deflection or collapse, of thin metal plates corresponding to the part of the first cooling water passage parts 32 and 34. This maintains space where cooling water can flow in or out the separator 10.

As illustrated in FIGS. 5A and 6A, one projection 36, 38 is formed to be divided into a first projection part 36A and a second projection part 36B with a gasket line 37A being sandwiched therebetween. With such a structure, the airtightness of the gasket line 37A is maintained. That is, on the first surface 10a of the first plate member 10A, the gasket line 37A constitutes a protrusion, and the projections 36 and 38 are inverted and constitute a groove. If one projection 36, 38 is provided to cross the gasket line 37A, a protrusion as the gasket line 37A on the first surface 10a of the first plate member 10A is divided in the middle in the longer direction (i.e., right-left direction) by a groove obtained by inverting the projections 36 and 38. If the gasket line 37A is divided by a groove, the airtightness of the gasket line 37A is deteriorated at the divided part. Accordingly, the continuity of the gasket line 37A is maintained by the structure wherein one projection 36, 38 extended in a direction crossing the gasket line 37A is formed to be divided into a first projection part 36A and a second projection part 36B with the gasket line 37A being sandwiched therebetween. As a result, the airtightness of the gasket line 37A is maintained.

The upper ends of the projections 36 and 38 illustrated in FIGS. 5A and 6A are separated from all of the convex parts 31, the convex parts 39, the concave parts 31a and the concave parts 39a illustrated in FIGS. 3A and 3B. With such a structure, cooling water, which has been guided by the projections 36 and 38 from the lower side to the upper side of the first cooling water passage parts 32 and 34, spreads in the right-left direction in front of the cooling water flow channel wall, which is composed of the convex parts 31, the convex parts 39, the concave parts 31a and the concave parts 39a. As a result, cooling water, which has flown through the first cooling water passage parts 32 and 34, flows smoothly into a flow channel of cooling water defined by the cooling water flow channel wall.

Since the intervals L2, L3 and L5 illustrated in FIGS. 5B and 6B are set equal to or larger than 5 mm, preferable flow of cooling water through the three spaces SP1, SP2 and SP3 is achieved. On the other hand, since these intervals L2, L3 and L5 are set equal to or smaller than 20 mm, thin metal plates corresponding to the part of the first cooling water passage parts 32 and 34 are divided to have a hardly deformable length. This enhances the rigidity of the thin metal plates corresponding to the part of the first cooling water passage parts 32 and 34, and suppresses deformation thereof.

As in Second Embodiment illustrated in FIGS. 6A and 6B, the height of each projection 38 becomes smaller in case where projections 38 corresponding to each other are provided at both of the first cooling water passage part 32, which is formed on the second surface 10b of the first plate member 10A, and the first cooling water passage part 34, which is formed on the first surface 10c of the second plate member 10B. This decreases the drawing amount of the metal plates in the process of forming of the projections 38 by press work, and facilitates processing of the projections 38.

Accordingly, since the projections 36 and 38 are provided as described above, the separator 10 can be constructed with thinner metal plates. As two metal plates which constitute the separator 10 become thinner, miniaturization and weight reduction of the stack 1A are achieved.

It is to be noted that similar effects are obtained and the present embodiment contributes to thinning of two metal plates which constitute the separator 10, even in case where the aforementioned projections 36 and 38 are provided at the second cooling water passage part 33 of the first plate member 10A illustrated in FIG. 3A and at the second cooling water passage part 35 of the second plate member 10B illustrated in FIG. 3B.

<Other Changes>

A separator according to the present disclosure is not limited to the structure described above. For example, a metal plate which constitutes the separator is not limited to a plate processed by press work. For example, the separator may be constituted of a metal plate processed by cutting work. Moreover, projections to be provided at the first cooling water passage part and the second cooling water passage part are not limited to the illustrated structure. For example, the number, shape, interval or the like of projections may be modified.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims. That is, embodiments obtained by combining technical means appropriately modified within the scope defined by the appended claims are also included in the technical scope of the present invention.

It is noted that, as used herein and in the appended claims, the singular forms "a", "an", and "the" include plural referents unless the context clearly dictates otherwise.

What is claimed is:

1. A separator comprising:
   a flat plate-shaped first plate member;
   a flat plate-shaped second plate member joined with the first plate member, wherein the separator is positioned between an anode electrode and a cathode electrode;
   an oxidation gas flow channel wall, which is provided on a first surface of the first plate member and forms a flow channel of oxidation gas;
   a fuel gas flow channel wall, which is provided on a second surface of the second plate member and forms a flow channel of fuel gas;
   a cooling medium flow channel wall, which is provided on at least one of a second surface that is a surface on a side opposite to the first surface of the first plate member and faces the second plate member, and a first surface that is a surface on a side opposite to the second surface of the second plate member and faces the first plate member, corresponds to at least one of the oxidation gas flow channel wall and the fuel gas flow channel wall, and forms a flow channel of a cooling medium;
   a first through hole, which is formed at a position different from the cooling medium flow channel wall and penetrates the first plate member and the second plate member;
   a second through hole, which is formed at a position different from the cooling medium flow channel wall and from the first through hole and penetrates the first plate member and the second plate member;
   a first cooling medium passage part, which is formed by separating a part of the second surface of the first plate member and a part of the first surface of the second plate member from each other and establishes communication between the first through hole and one end of the cooling medium flow channel wall;
   a second cooling medium passage part, which is formed by separating a part of the second surface of the first plate member and a part of the first surface of the second plate member from each other and establishes communication between the second through hole and the other end of the cooling medium flow channel wall;
   one projection, which is formed on at least one of the first cooling medium passage part and the second cooling medium passage part, is projected from the second surface of the first plate member toward the first surface of the second plate member, and is separated from the cooling medium flow channel wall;
   another projection, which is formed at a position corresponding to the one projection on at least one of the first cooling medium passage part and the second cooling medium passage part, is projected form the first surface of the second plate member to the second surface of the first plate member, is separated from the cooling medium flow channel wall, and comes into contact with the one projection in a state where the first plate member and the second plate member are joined with each other; and
   a plurality of spaces formed by the one projection and the other projection, forming at least one of the first cooling medium passage part and the second cooling medium passage part.

2. The separator according to claim 1, wherein the one projection and the other projection are formed at both of the first cooling medium passage part and the second cooling medium passage part.

3. The separator according to claim 1, wherein one end of the one projection and one end of the other projection are extended toward the cooling medium flow channel wall along a passage direction of the cooling medium in at least one of the first cooling medium passage part and the second cooling medium passage part.

4. The separator according to claim 3, wherein the other end of the one projection and the other end of the other projection are extended toward at least one of the first through hole and the second through hole.

5. The separator according to claim 1, wherein a plurality of one projections and a plurality of other projections are provided on at least one of the first cooling medium passage part and the second cooling medium passage part.

6. The separator according to claim 5, wherein the plurality of one projections and the plurality of other projections are provided side by side in a cross direction to a passage direction of the cooling medium in at least one of the first cooling medium passage part and the second cooling medium passage part, and an interval between two adjacent one projections and an interval between two adjacent other projections are equal to or larger than 5 mm, and equal to or smaller than 20 mm in a state where the first plate member and the second plate member are joined with each other.

7. The separator according to claim 5, wherein the plurality of one projections and the plurality of other projections are provided side by side in a cross direction to a passage direction of the cooling medium in at least one of the first cooling medium passage part and the second cooling medium passage part, and an interval between each end part of the cooling medium passage part in the cross direction and each of the one projection and the other projection which is adjacent to the end part is equal to or larger than 5 mm, and equal to or smaller than 20 mm in a state where the first plate member and the second plate member are joined with each other.

8. A separator comprising:
a flat plate-shaped first plate member;
a flat plate-shaped second plate member joined with the first plate member, wherein the separator is positioned between an anode electrode and a cathode electrode;
an oxidation gas glow channel wall, which is provided on a first surface of the first plate member and forms a flow channel of oxidation gas;
a fuel gas flow channel wall, which is provided on a second surface of the second plate member and forms a flow channel of fuel gas;
a cooling medium flow channel wall, which is provided on at least one of a second surface that is a surface on a side opposite to the first surface of the first plate member and faces the second plate member and a first surface that is a surface on a side opposite to the second surface of the second plate member and faces the first plate member, corresponds to at least one of the oxidation gas flow channel wall and the fuel gas flow channel wall, and forms a flow channel of a cooling medium;
a first through hole, which is formed at a position different from the cooling medium flow channel wall and penetrates the first plate member and the second plate member;
a second through hole, which is formed as a position different from the cooling medium flow channel wall and from the first through hole and penetrates the first plate member and the second plate member;
a first cooling medium passage part, which is formed by separating a part of the second surface of the first plate member and a part of the first surface of the second plate member from each other and establishes communication between the first through hole and one end of the cooling medium flow channel wall;
a second cooling medium passage part, which is formed by separating a part of the second surface of the first plate member and a part of the first surface of the second plate member from each other and establishes communication between the second through hole and the other end of the cooling medium flow channel wall; and
a plurality of projections, which are formed side by side in a cross direction to a passage direction of the cooling medium in at least one of the first cooling medium passage part and the second cooling medium passage part, is projected from one towards the other of the second surface of the first plate member and the first surface of the second plate member, and is separated from the cooling medium flow channel wall,
wherein an interval between two projections including a center of a width in the cross direction of at least one of the first cooling medium passage part and the second cooling medium passage part is larger than an interval between an end part in the cross direction of at least one of the first cooling medium passage part and the second cooling medium passage part, and a projection adjacent to the end part.

9. The separator according to claim 8, wherein the plurality of projections are provided side by side in a cross direction to a passage direction of the cooling medium in at least one of the first cooling medium passage part and the second cooling medium passage part, and an interval between two adjacent projections is equal to or larger than 5 mm, and equal to or smaller than 20 mm in a state where the first plate member and the second plate member are joined with each other.

10. The separator according to claim 8, wherein the plurality of projections are provided side by side in a cross direction to a passage direction of the cooling medium in at least one of the first cooling medium passage part and the second cooling medium passage part, and an interval between an end part in the cross direction of the cooling medium passage part and a projection adjacent to the end part is equal to or larger than 5 mm, and equal to or smaller than 20 mm in a state where the first plate member and the second plate member are joined with each other.

* * * * *